(12) United States Patent
Hartlohner et al.

(10) Patent No.: US 8,454,278 B2
(45) Date of Patent: Jun. 4, 2013

(54) EIGHT-EDGED CUTTING INSERT, AND TOOL HOLDER FOR SAME

(75) Inventors: Rudi Hartlohner, Tuchenbach (DE); Igor Kaufmann, Nuremberg (DE)

(73) Assignee: Kennametal Inc., Latrobe, PA (US)

( * ) Notice: Subject to any disclaimer, the term of this patent is extended or adjusted under 35 U.S.C. 154(b) by 815 days.

(21) Appl. No.: 12/597,985

(22) PCT Filed: Feb. 2, 2008

(86) PCT No.: PCT/EP2008/000839
§ 371 (c)(1),
(2), (4) Date: Jan. 12, 2010

(87) PCT Pub. No.: WO2008/138413
PCT Pub. Date: Nov. 20, 2008

(65) Prior Publication Data
US 2010/0129166 A1   May 27, 2010

(30) Foreign Application Priority Data
May 14, 2007  (DE) .................. 10 2007 022 536

(51) Int. Cl.
*B23C 5/22* (2006.01)
*B23B 27/16* (2006.01)

(52) U.S. Cl.
USPC .......................................... 407/113; 407/114

(58) Field of Classification Search
USPC .................... 407/113, 114, 115, 116
See application file for complete search history.

(56) References Cited

U.S. PATENT DOCUMENTS

| | | | | |
|---|---|---|---|---|
| 3,142,110 A | * | 7/1964 | Hertel | 407/114 |
| 3,490,117 A | * | 1/1970 | Hertel | 407/104 |
| 4,074,949 A | * | 2/1978 | Hochmuth et al. | 407/114 |
| 4,294,566 A | * | 10/1981 | Boone | 407/114 |
| 4,636,116 A | | 1/1987 | Shikata | |
| 5,442,981 A | | 8/1995 | Vegh | |
| 5,639,189 A | | 6/1997 | Hoefler | |
| 5,810,518 A | | 9/1998 | Wiman et al. | |
| 5,820,308 A | | 10/1998 | Hoefler | |
| 5,855,457 A | | 1/1999 | Arai et al. | |
| 6,050,751 A | | 4/2000 | Hellstrom | |
| 6,053,672 A | | 4/2000 | Satran et al. | |
| 6,742,969 B1 | | 6/2004 | Hoefler | |
| 6,769,844 B2 | | 8/2004 | Waggle | |

(Continued)

FOREIGN PATENT DOCUMENTS

| | | |
|---|---|---|
| DE | 1 232 436 | 1/1967 |
| DE | 103 57 811 A1 | 7/2004 |
| EP | 1 380 375 A1 | 1/2004 |
| EP | 1 480 774 B1 | 12/2004 |
| EP | 1 572 407 B1 | 9/2005 |

(Continued)

*Primary Examiner* — Will Fridie, Jr.
(74) *Attorney, Agent, or Firm* — Larry R. Meenan

(57) ABSTRACT

The invention relates to an eight-edged rotatable and reversible cutting insert having two opposite, substantially square base surfaces which are twisted relative to one another about a central axis running perpendicularly to said base surfaces, and having four identical side surfaces. A main lip is formed between each base surface and each side surface and extends only over part of the length of the side surface. Each side surface has two diagonally opposite corner edges which are of circular or curved design and form a secondary lip adjacent to the respective main lip. In addition, each side surface has two chip pockets which are drawn into the side surface and which, starting from the respective corner edge, extend along the main lip assigned to said corner edge up to a rear chip pocket end.

17 Claims, 7 Drawing Sheets

U.S. PATENT DOCUMENTS

| | | |
|---|---|---|
| 6,811,359 B2 | 11/2004 | Craig |
| 6,929,428 B1 | 8/2005 | Wermeister et al. |
| 7,063,489 B2 * | 6/2006 | Satran .................. 407/113 |
| 7,094,007 B2 | 8/2006 | Satran et al. |
| 7,168,512 B2 * | 1/2007 | Schuffenhauer et al. ..... 175/426 |
| 2004/0013478 A1 | 1/2004 | Dehn et al. |
| 2005/0063792 A1 | 3/2005 | Satran |
| 2005/0214081 A1 | 9/2005 | Satran et al. |

FOREIGN PATENT DOCUMENTS

| | | |
|---|---|---|
| JP | S5151579 | 10/1974 |
| JP | H685712 U | 12/1994 |
| RU | 2201317 C2 | 3/2003 |
| SU | 1060322 A | 12/1983 |
| SU | 1715511 A1 | 2/1992 |
| WO | 03/074218 A1 | 9/2003 |

\* cited by examiner

EIGHT-EDGED CUTTING INSERT, AND TOOL HOLDER FOR SAME

BACKGROUND OF THE INVENTION

1) Field of the Invention

The invention relates to an eight-edged rotatable and reversible cutting insert having two opposite, substantially square base surfaces which are twisted relative to one another about a central axis running perpendicularly to said base surfaces, and having four identical side surfaces. It also relates to a tool holder for such a cutting insert.

2) Description of the Related Art

A multi-edged cutting body made of a hard cutting material is known from DE-B 1 232 436, said cutting body being formed from two truncated-pyramid-like cutting body halves, the base surfaces of which, located opposite one another while forming four identical side surfaces, are twisted relative to one another. The side surfaces form with both base surfaces a total of eight cutting edges which extend in each case over the entire length of the side surfaces and of the base surfaces. A central hole running at right angles to the base surfaces of the cutting body halves and therefore perpendicularly to the central axis serves to accommodate a screw, by means of which the cutting insert can be fastened in a recess of a tool holder. The four identical side surfaces have flat rake faces which are assigned to and are adjacent to the respective cutting edges and which extend transversely to the central axis along the entire cutting edge and in the direction of the central axis up to the side surface center, in which the two cutting body halves are adjacent to one another.

In the tangential cutting tip used, for example, in a turning tool, the eight cutting edges thereof can be brought into use one after the other by rotating and reversing the cutting tip in the tool holder.

The object of the invention is to specify an improved eight-edged cutting insert of the type mentioned at the beginning. Furthermore, a tool holder which is especially suitable for accommodating such a cutting insert is to be specified.

SUMMARY OF THE INVENTION

This object is achieved according to the invention by the features of claim 1. Advantageous configurations, developments and variants are the subject matter of the dependent claims referring back to claim 1.

The eight-edged rotatable and reversible cutting insert according to the invention has in each side surface two chip pockets drawn into the same. These chip pockets extend along the main lip assigned thereto between a corner edge, at which the main lip merges into a secondary lip, up to a rear chip pocket end. The main lip and the chip pocket assigned thereto extend in this case only over part of the length of the side surface. The chip pocket consequently ends within this side surface at the respective chip pocket end.

The two chip pockets preferably overlap at least partly within each side surface. The chip pockets in this case, as well as the secondary lips, the main lips and the corner edges which connect said secondary and main lips and are expediently of circular or curved design, are arranged diagonally opposite one another. Each chip pocket and also the main lip assigned thereto and the secondary lip likewise assigned to said chip pocket and running substantially transversely to the main lip are therefore always located in the region of one of the two cutting body halves or cutting insert halves, the base surfaces of which, spaced apart by the width of the side surface, are twisted relative to one another. The other lips (main and secondary lips) together with the chip pocket assigned to them are then arranged within the same side surface on the opposite side in the other cutting body half.

A pocket crest is formed between the two chip pockets of the respective side surface, said pocket crest being raised relative to the pocket bottoms of the two chip pockets. In this case, that region or section of the pocket crest which runs between pocket ridges, facing one another, of the two chip pockets is comparatively narrow compared with that region or section of the pocket crest which extends beyond the chip pocket ends of the adjacent chip pockets. In other words, to the rear of the respective chip pocket end, the pocket crest is widened toward the base surface facing the associated chip pocket.

In an expedient configuration, this widened region of the pocket crest extends up to the secondary lip of the respectively adjacent side surface of the same cutting body half.

There, the widened pocket crest forms the secondary flank for this secondary lip of the respectively adjacent side surface. These secondary flanks formed by the respective pocket crest therefore likewise lie diagonally opposite within this side surface.

According to an expedient variant, the pocket crest formed between the chip pockets and extending symmetrically beyond their chip pocket ends over the side surface is twisted or tilted about at least one axis and is therefore designed to run obliquely. The twist axis is in this case the central axis and/or an axis, perpendicular thereto, of the cutting body, which axis extends perpendicularly to the central axis and is normal to the respective side surface. In a Cartesian coordinate system in which the central axis runs in the y direction and the axis perpendicular to said side surface runs in the z direction, the pocket crest is inclined toward the center of this side surface about an axis running in the x direction and perpendicular to the two side surfaces adjacent to this side surface.

The pocket crest is preferably also additionally inclined again toward the center of this side surface about the central axis (y direction). The pocket crest, roughly funnel-shaped as a result, of this side surface therefore has the deepest point in the central region of this side surface, i.e. in the surface center.

According to a suitable configuration, in particular of this variant of the cutting insert, a surface region which is raised relative to the pocket bottom and which is level, i.e. is not inclined, in particular also not toward the surface center, and is therefore planar with respect to this side surface is formed starting from the respective chip pocket end. In this configuration, the respective chip pocket expediently has a pocket corner which is diagonally opposite the respective corner edges and with which this chip pocket is adjacent to both the level surface region and the comparatively narrow region or section of the central pocket crest.

In principle, each chip pocket has a comparatively long pocket ridge which is brought up to the main lips assigned to this chip pocket. A further, comparatively narrow pocket ridge of the same chip pocket is brought up to the secondary lip connected to this main lip via the corner edge. In this case, in an advantageous configuration, the pocket ridge or each of these pocket ridges can be arched inward (concavely) toward the central axis, with a sunken main lip and a sunken secondary lip, respectively, being formed. Consequently the main lip and/or the secondary lip are/is drawn in toward the central axis in the edge region between this side surface and the base surface assigned thereto or the side surface adjacent to said side surface. The corresponding corner edge then has a transition region which is raised relative to the drawn-in main lip and the adjacent likewise drawn-in secondary lip.

In the central region between the two cutting body halves adjacent to one another in each case, the secondary lips of side surfaces adjacent to one another are directed past one another in a partly overlapping but spaced-apart manner. In this central region, the lip ends, directed past one another in a spaced-apart manner, of the secondary lips form an offset surface in each of these two adjacent side surfaces, these two offset surfaces being disposed at an angle, expediently at an obtuse angle or approximately at a right angle, to one another.

A multi-edged, rotatable and reversible cutting insert in which the secondary lips of side surfaces adjacent to one another are directed past one another in a spaced-apart manner at the ends and while forming offset surfaces disposed at an angle to one another is already inventive on its own. This design of the secondary lips of such a cutting insert therefore represents an independent invention.

On account of the four identical side surfaces and of the two identical base surfaces delimiting said side surfaces, the cutting insert according to the invention has 90° symmetry. The lips, effective as main and secondary lips, or cutting edges of the cutting insert can therefore be brought into use one after the other by a respective 90° rotation of the cutting insert in a tool holder before the cutting insert is reversed in the tool holder by 180° in order to bring into use the other four lips by corresponding 90° rotations. For this purpose, the cutting insert, suitable in particular as a tangential cutting insert, is arranged on end in the tool holder with respect to the longitudinal axis of the workpiece to be machined.

An especially preferred tool holder for such an eight-edged, rotatable and reversible cutting insert or tangential cutting insert has a recess as tip seat, comprising a bearing surface for the cutting insert to bear against with its base surfaces, and two seating regions arranged substantially at right angles relative thereto and to one another and intended for the cutting insert to bear against with its side surfaces. These seating regions are designed for the respective side surface to bear against with its surface regions and/or pocket crests raised relative to the chip pockets. In this case, the seating regions expediently have a supporting region designed like an impression of the level surface region or of the pocket crest of the side surfaces. By means of this geometry of the recess, effective as a tip seat, of the tool holder, for example of, in particular, a turning tool, the high forces produced during the machining are reliably introduced into the tool holder and are therefore absorbed by the latter in order to ensure a non-destructible tip seat.

The advantages achieved with the invention consist in particular in the fact that, during the machining of a workpiece with such a cutting insert, especially good chip formation and an especially large chip breaking region are achieved on account of the chip pockets incorporated or formed in the side surfaces. In addition, an increased chip volume by means of a comparatively smooth cut with a positive radial rake angle and increased variability on account of a setting angle of greater than 90° can be realized.

The cutting insert according to the invention is advantageously produced as a pressed or die-cast part. A grinding operation normally required following a pressing operation for such a cutting body in a further machining step can therefore be dispensed with.

BRIEF DESCRIPTION OF THE DRAWINGS

Exemplary embodiments of the invention are explained in more detail below with reference to a drawing, in which.

DETAILED DESCRIPTION OF THE INVENTION

Figure 1:
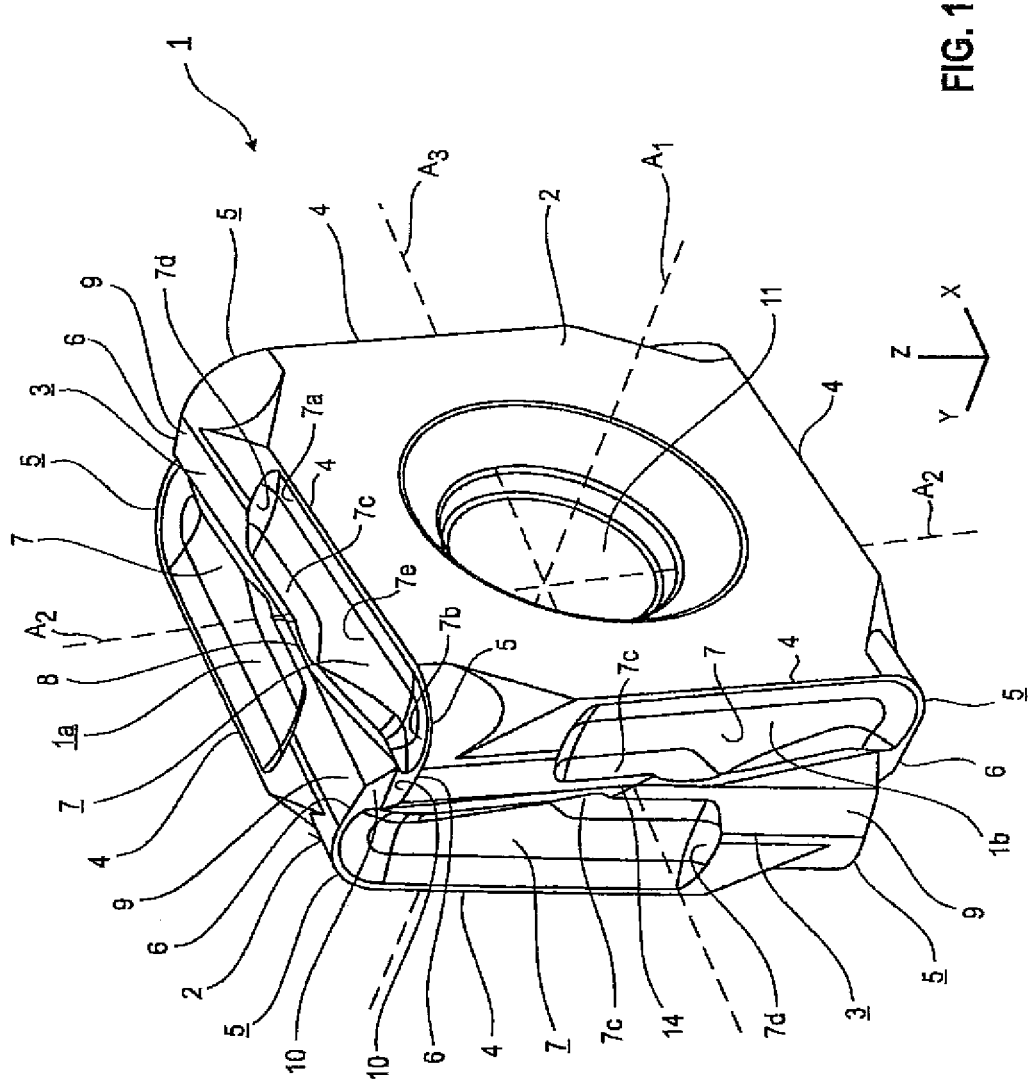
FIG. 1 shows, in a perspective view, an eight-edged cutting insert having cutting body halves twisted relative to one another and having chip pockets drawn into the identical side surfaces.

Parts corresponding to one another are provided with the same reference numerals in all the figures.

According to FIGS. 1 to 5, the tangential cutting insert 1, which is designated below as cutting insert but which may also be designated as tangential cutting tip, has two opposite, identical and substantially square base surfaces 2 and four identical side surfaces 3, of which only two adjacent side surfaces 3 can be seen in FIG. 1 and only one individual side surface 3 can be seen in FIG. 3. The cutting insert 1 may also as. With respect to the coordinate system (x, y, z) shown, the central tip axis or central axis $A_1$ perpendicular to the base surfaces 2 runs in the y direction. An axis $A_2$ perpendicular thereto runs in the z direction and is disposed perpendicularly to two opposite side surfaces 3. An axis $A_3$ which is perpendicular to both the central axis $A_1$ and this axis $A_2$ and which runs perpendicularly to the other two opposite side surfaces 3 runs in the x direction. The center plane of the cutting tip 1 is located in the plane defined by the axes $A_2$ and $A_3$ normal to the side surfaces 3, the two base surfaces 2 being spaced equidistantly from this center plane along the central axis $A_1$.

Figure 2:
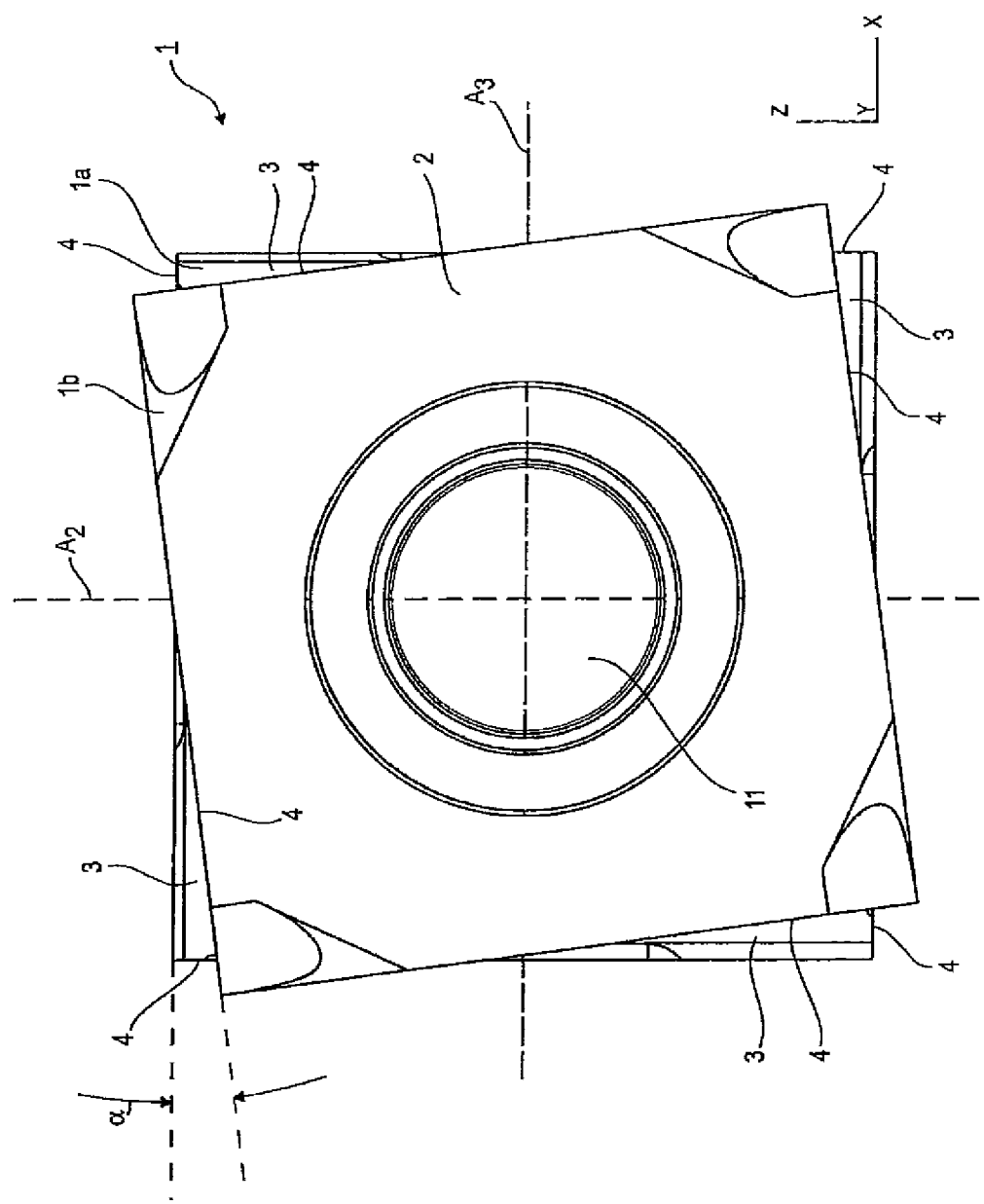
FIG. 2 shows the cutting insert according to FIG. 1 in a side view of one of its base surfaces.

The two base surfaces 2 of the cutting insert 1 are twisted relative to one another about the central axis $A_1$, as can be seen especially clearly from FIG. 2. The twist angle α of the two base surfaces 2 should in principle be greater than 0° and less than 20° and is in particular (10±5)°. The twist angle is preferably within the region of a conventional or typical clearance angle of about 6° and is preferably about 8°. On account of the base surfaces 2 twisted relative to one another in each case by about 4° with respect to the x direction, and likewise the z direction, virtually two cutting body halves 1a and 1b of the cutting insert 1 are formed, said cutting body halves 1a and 1b being adjacent to one another or merging into one another in the center plane (xz plane) defined by the two axes $A_2$ and $A_3$.

Each of the identical side surfaces 3 forms with each base surface 2 a main lip 4 which extends only over part of the length of the respective side surface 3. In addition, each side surface 3 has opposite, rounded-off or curved corner edges 5. The respective corner edge (corner radius) 5 forms a secondary lip 6 adjacent to the respective main lip 4 and extending into the side surface 3 adjacent to this side surface 3. A chip pocket 7 drawn into the respective side surface 3, i.e. arched inward (concavely) toward the central axis $A_1$, is assigned to each cutting edge formed from main lip 4, corner edge 5 and secondary lip 6. Two chip pockets 7—as well as the assigned main lips 4, the corner edges 5 and the secondary lips 6—therefore lie diagonally opposite one another within the respective side surface 3.

Each chip pocket 7 has a pocket ridge 7a drawn up to the respective main lip 4, i.e. drawn up with respect to a pocket bottom 7e, and a pocket ridge 7b brought up to the respective secondary lip and also a pocket ridge 7c facing the other respective chip pocket 7 of this side surface 3, and a chip pocket end 7d. The chip pocket end 7d, which is located inside the respective side surface 3, is spaced apart from the next adjacent side surface 3. This chip pocket end 7d is likewise formed by a pocket ridge raised relative to the pocket bottom 7e.

A pocket crest or pocket apex 8 is formed between the two chip pockets 7 of the respective side surface 3. This pocket crest 8 is comparatively narrow in the region between the expediently overlapping chip pockets 7 and comparatively wide in the region to the rear of the chip pocket ends 7d. In other words, with respect to the central axis $A_1$, the axial extent of the pocket crest 8 is narrower in the region between the two chip pockets 7 than in the region between the chip pocket ends 7d and the secondary lip 6 of the adjacent side surface 3 facing the chip pocket end 7d. There, the comparatively wide or widened pocket crest 8 forms a respective secondary flank 9 for the secondary lip 6 of the adjacent side surface 3.

As can be seen comparatively clearly from FIG. 1, the secondary lips 6 of the two side surfaces 3 adjacent to one another overlap in a spaced-apart manner—in the plane of the respective side surface 3 or in the region of the center plane (xz plane) defined by the axes $A_2$ and $A_3$. The two secondary lips 6 therefore do not merge into one another either directly or indirectly, but rather run in a spaced-apart manner, with offset surfaces 10 being formed. These offset surfaces 10 are located in the plane of the corresponding side surface 3 and are therefore disposed at right angles or at an obtuse angle to one another.

Figure 6:
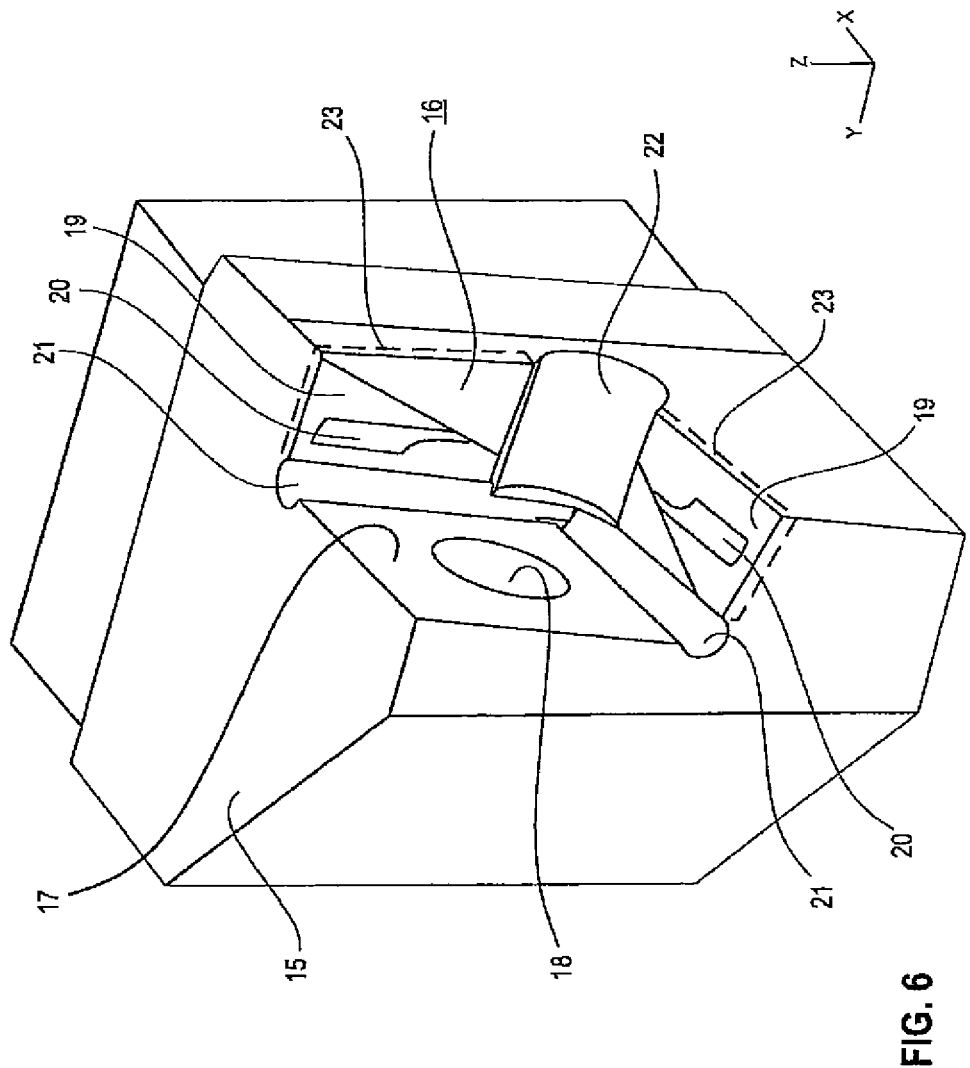
FIG. 6 shows a tool holder for accommodating such a cutting insert, in a perspective view.
Figure 7:
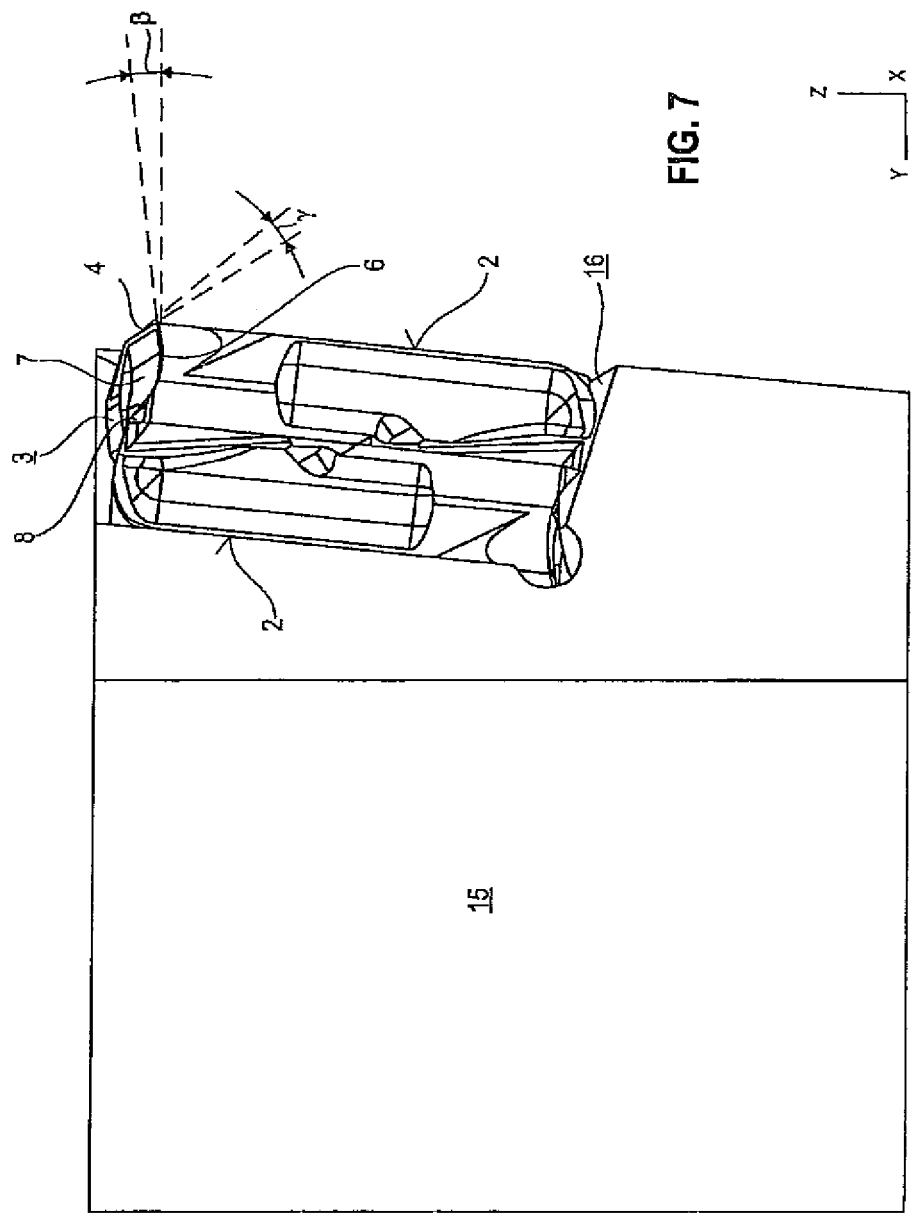
FIG. 7 shows the tool holder with inserted cutting insert (tangential cutting insert) in a side view.

A central hole 11 which passes through the cutting tip 1 along the central axis $A_1$ serves to accommodate a fixing element (not shown), for example a screw or a bolt, for tightening and/or clamping the cutting insert 1 in a tool holder, shown in FIGS. 6 and 7, of a turning tool.

Figure 3:
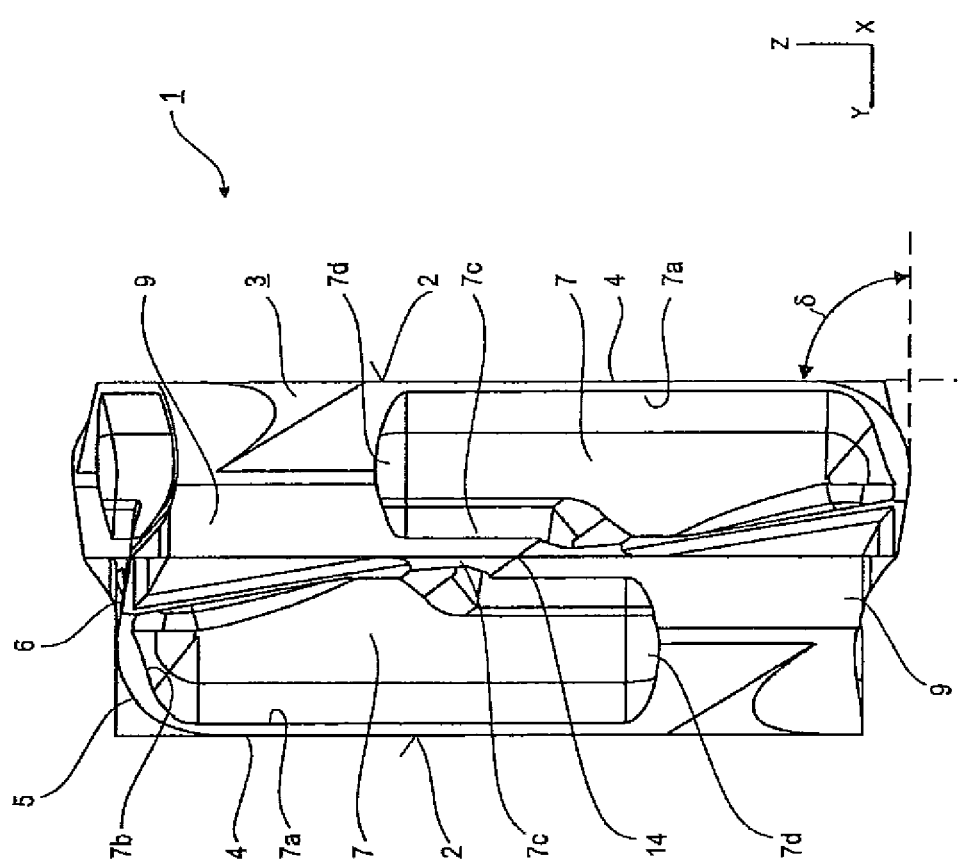
FIG. 3 shows the cutting insert in a view of one of its side surfaces.
Figure 4:
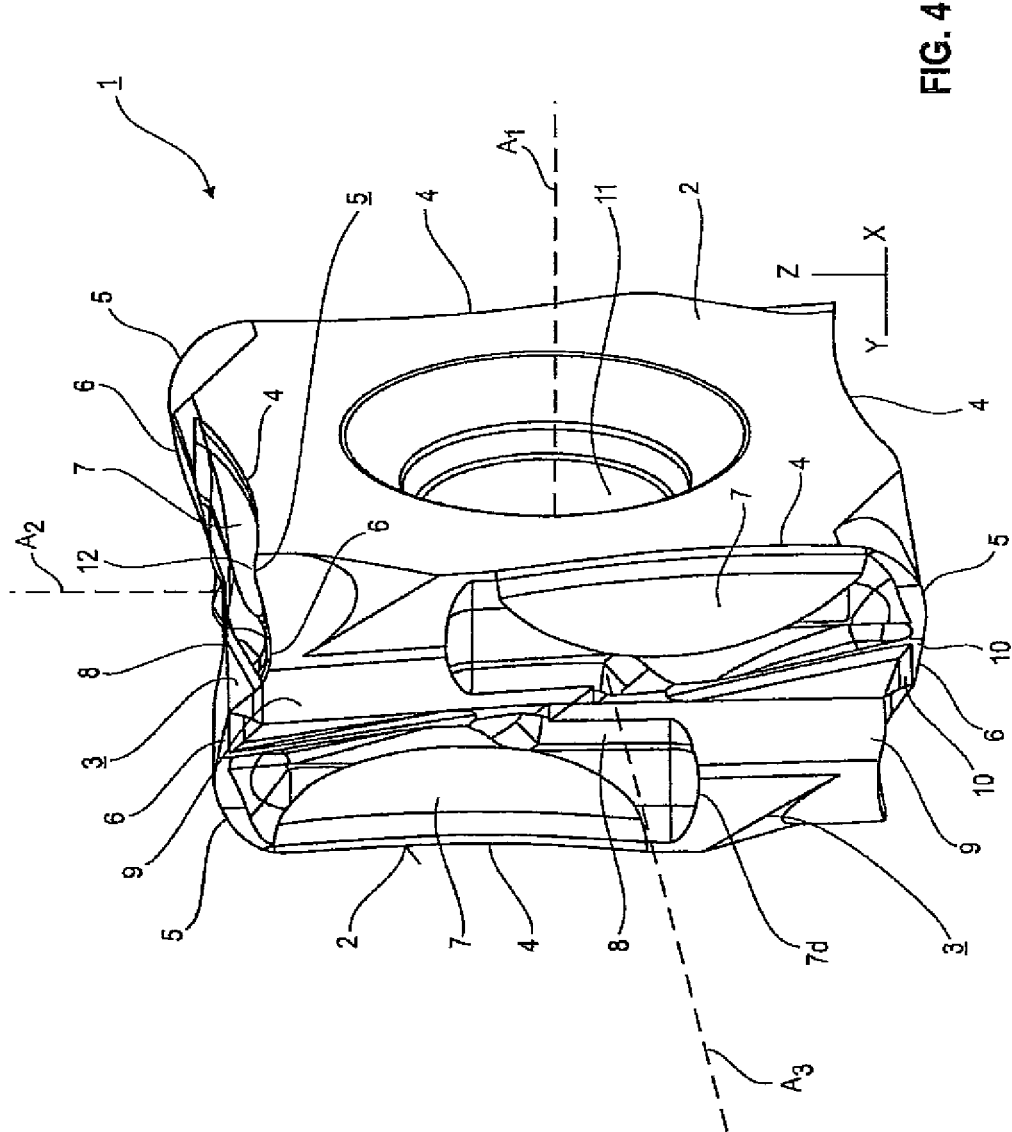
FIG. 4 shows a variant of the cutting insert having drawn-in or inwardly arched main lips and drawn-in or inwardly arched secondary lips, in a perspective view.

The cutting insert 1 shown in FIG. 4 differs from the cutting insert 1 according to FIGS. 1 to 3 in that the respective main lip 4 and the respective secondary lip 6 are arched inward, i.e. are drawn in toward the central axis $A_1$. As a result of this geometry, the transition region between the main lip 4 and the secondary lip 6 represents the highest cutting edge point 12 within the corner edge 5. With respect to the plane defined by the central axis $A_1$ and the axis $A_2$ or the axis $A_3$, the cutting edge point 12 and thus the corner edge 5 are further away than that cutting edge region of the drawn-in or inwardly arched main lip 4 and/or secondary lip 6 which is at the smallest or minimum cutting edge distance from the central axis $A_1$.

The cutting insert 1 shown in FIG. 5 again corresponds to the cutting insert 1 according to FIG. 1, wherein, in contrast to the cutting insert 1 shown there, each side surface 3 has two diagonally opposite level surface regions 13. These level surface regions 13 adjoin the respective chip pocket end 7d of the chip pocket 7 located in the same cutting body half 1a, 1b. These level surface regions 13 symmetrical with respect to the axis $A_2$ or $A_3$ are therefore located between the respectively adjacent chip pocket end 7d of the corresponding chip pocket 7 and the secondary flank 9 of the secondary lip 6 of the adjacent side surface 3 in this cutting tip half 1a or 1b.

Figure 5:
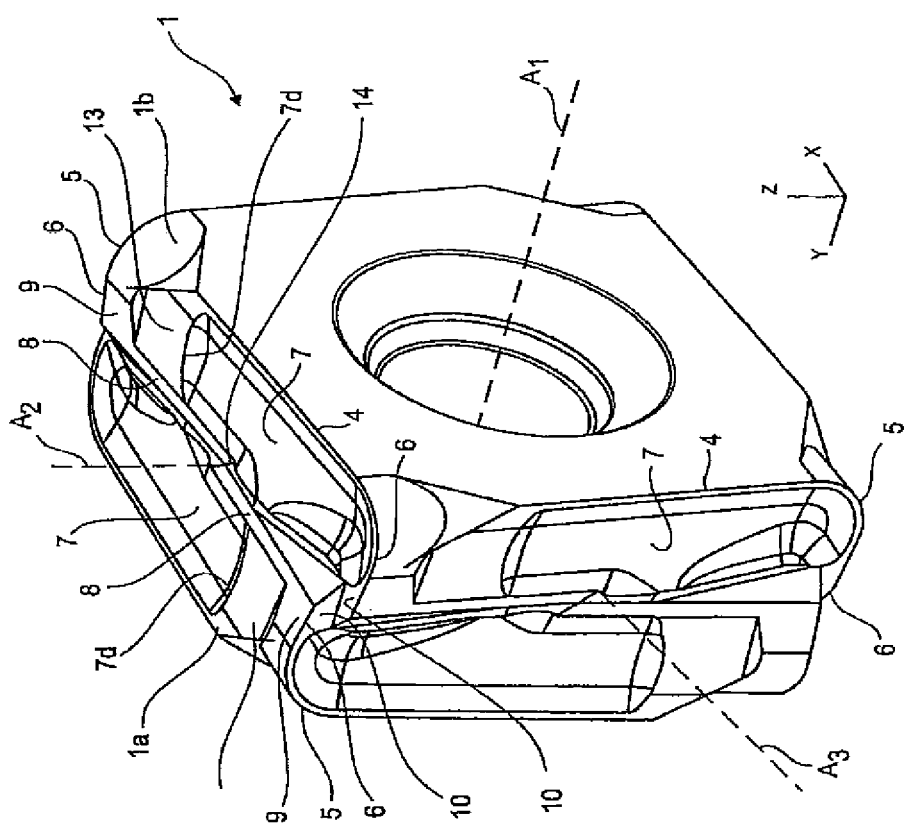
FIG. 5 shows, in a view according to FIG. 1, a cutting insert having level surface regions of an otherwise inclined or twisted pocket crest.

In the embodiment of the cutting insert 1 according to FIG. 1 and in the embodiment according to FIG. 5 having a level surface region 13, the pocket crest 8 is expediently designed to run inclined or obliquely toward the central center plane (xz plane) and toward the surface center 14 of the respective side surface 3. To this end, the pocket crest 8 and the secondary flanks 9 formed by said pocket crest 8 are tilted about the axis $A_3$ on the one hand and about the central axis $A_1$ on the other hand. The orientation of the corresponding twisting or tilting is in this case always directed toward the tip center or surface center 14 of the cutting tip 1. The two sections of the pocket crest 8 which extend from the surface center 14 symmetrically to the adjacent two side surfaces 3 opposite one another are consequently inclined or twisted relative to one another, with a virtually funnel-like surface shape of the pocket crest 8 being formed.

FIG. 6 shows, in perspective, a tool holder 15 for such an eight-edged, rotatable and reversible cutting insert 1. To this end, the tool holder 15 has a recess 16 as tip seat for the cutting insert 1. The tool holder 15 designed as a turning tool and having inserted cutting insert 1 is shown in FIG. 7 in a side view of a side surface 3.

The recess 16 has a bearing surface 17, against which the cutting insert 1 bears with its base surface 2. A tapped hole 18 in the region of this bearing surface 17 serves to accommodate the fixing screw (not shown) which passes through the central hole 11 in the cutting insert 1 and by means of which the cutting insert 1 is tightened inside the recess 16 against this bearing surface 17 in the fitted state. In addition, the recess 16 has two seating regions 19 arranged substantially at right angles to one another and intended for the cutting insert 1 to bear against with in each case two side surfaces 3 adjacent to one another.

Provided in the region of each of these seating regions 19 is a supporting region 20 with which the respective side surface 3 is in contact merely in the region of the corresponding pocket crest 8 in the corresponding seating region 19 of the recess 16. Circular-arc-shaped corner regions 21 and 22 of the recess 16 form locating regions which are drawn into the tool holder 15 and in which those main lips 4, secondary lips 6 or corner edges 5 of the cutting body 1 which are formed between the side surfaces 3 resting in the recess 16 and the base surface 2 bearing against the bearing surface 17 rest.

The or each seating region 19 may also be formed by a, for example plate-like, seating element 23 (shown by broken lines) as an additional rest which is inserted into the recess 16 and fixed there. Such an additional seating element 23 preferably made of a hard material is advantageous in particular during heavy-duty cutting.

As can be seen comparatively clearly from FIG. 7, the cutting insert 1 is arranged on end in the tool holder 15 with respect to the longitudinal axis, running in the y direction, of the workpiece (not shown) to be machined. The main and secondary lips 4 and 6, respectively, which are in use in this arrangement of the cutting tip 1 certainly lead in principle to a negative radial rake angle on account of the negative position of the cutting tip 1 in the tool holder 15 and as a result of the base side 2 which is in use and which is twisted relative to the base surface 2 bearing against the bearing surface 17 of the recess 16. However, the preferably drawn-in configuration or geometry of the secondary lip 6 leads overall to a positive rake angle β.

The relationships are also similar with regard to the axial rake angle, which, in a corresponding fitted position of the cutting insert 1 as shown in FIG. 2, likewise leads in principle to a negative rake angle corresponding to the inclination or twist angle α. However, the drawn-in or sunken configuration or geometry of the main lip 4 according to the embodiment in FIG. 4 again leads overall to a positive axial rake angle γ. In this configuration of the cutting insert 1 and its arrangement in the tool holder 15, said cutting insert 1 is effective as a tangential cutting insert 1 with both a positive axial rake angle γ and a positive radial rake angle β. Increased variability of the tangential cutting insert 1 used in the tool holder 15 is made possible by the setting angle δ of preferably greater than 90° indicated in FIG. 3.

The chip breaker surfaces designed as chip pockets 7 and therefore as chip breaker surfaces dished in a pocket-like manner, i.e. arched inward into the respective side surface 3 toward the central axis $A_1$, ensure especially reliable chip disposal when the workpiece is being turned. As a result of the pocket ridge 8, which can likewise be incorporated by the symmetrical shaping of the chip pockets 7 in the side surfaces 3 of the eight-edged cutting insert 1, both especially effectively pronounced secondary flanks 9 and especially suitable supporting points or supporting regions 20 for a reliable tip seat of the plate-like cutting tip 1 (cutting tip) in the tool holder 15 are produced.

The invention claimed is:

1. An eight-edged rotatable and reversible cutting insert comprising two opposite, substantially square base surfaces which are twisted relative to one another about a central axis running perpendicularly to said base surfaces, and having four identical side surfaces, wherein:
   a) a main lip is formed between each base surface and each side surface and extends only over part of the length of the side surface,
   b) each side surface has two diagonally opposite corner edges which are of circular or curved design and form a secondary lip adjacent to the respective main lip, and
   c) each side surface has two chip pockets which are drawn into the side surface and which, starting from the respective corner edge, extend along the main lip assigned to said corner edge up to a rear chip pocket end.

2. The cutting insert as claimed in claim 1, wherein the two chip pockets within the same side surface extend beyond the surface center.

3. The cutting insert as claimed in claim 1, wherein a pocket crest raised relative to the pocket bottoms of the chip pockets is formed between the chip pockets.

4. The cutting insert as claimed in claim 3, wherein the pocket crest is formed between pocket ridges, facing one another, of the two chip pockets of the same side surface.

5. The cutting insert as claimed in claim 3, wherein the pocket crest extends symmetrically beyond the chip pocket ends of the adjacent chip pockets and is widened, starting from the respective chip pocket end, toward the base surfaces facing this chip pocket.

6. The cutting insert as claimed in claim 3, wherein the pocket crest extends up to the secondary lip of the respectively adjacent side surface and forms there a secondary flank for the secondary lip of the adjacent side surface.

7. The cutting insert as claimed in claim 3, wherein the pocket crest is designed to run inclined toward the surface center of the side surface.

8. The cutting insert as claimed in claim 7, wherein the pocket crest is twisted about the central axis and/or about an axis which runs transversely to the central axis and to an axis perpendicular thereto.

9. The cutting insert as claimed in claim 1, wherein a surface region which is raised relative to the pocket bottom and which is level with respect to this side surface is formed starting from the respective chip pocket end.

10. The cutting insert as claimed in claim 1, wherein each chip pocket has a pocket ridge brought up to the associated main lip and a pocket ridge brought up to the associated secondary lip, wherein the pocket ridge and/or the pocket ridge is arched inward toward the central axis, with a sunken main lip and a sunken secondary lip, respectively, being formed.

11. The cutting insert as claimed in claim 1, wherein the secondary lips of side surfaces adjacent to one another are spaced apart at the ends and are directed past one another, with offset surfaces disposed at an angle to one another being formed.

12. The cutting insert as claimed in claim 1, wherein the corner edges are rounded off and in particular are of circular or curved design.

13. A tool holder having an eight-edged rotatable and reversible cutting insert, wherein the cutting insert has two opposite, substantially square base surfaces which are twisted relative to one another about a central axis running perpendicularly to said base surfaces, and having four identical side surfaces, wherein:
   a) a main lip is formed between each base surface and each side surface and extends only over part of the length of the side surface,
   b) each side surface has two diagonally opposite corner edges which are of circular or curved design and form a secondary lip adjacent to the respective main lip, and
   c) each side surface has two chip pockets which are drawn into the side surface and which, starting from the respective corner edge, extend along the main lip assigned to said corner edge up to a rear chip pocket end.

14. The tool holder as claimed in claim 13, wherein the tool holder has a recess as tip seat, comprising a bearing surface for the cutting insert to bear against with its base surfaces, and comprising two seating regions arranged substantially at right angles to one another and intended for the cutting insert to bear against with two of its side surfaces, wherein the seating regions are designed for the respective side surface to bear against with its surface regions raised relative to the chip pockets.

15. The tool holder as claimed in claim 13, wherein the seating regions have a supporting region designed like an impression of the pocket crest and/or of the level surface region of the side surfaces.

16. The tool holder as claimed in claim 14, wherein the recess has a substantially square bearing region for the cutting insert to bear against with its base surface.

17. The tool holder as claimed in claim 14, wherein the or each seating region is formed by a seating element inserted into the recess and made in particular of a hard material.

* * * * *